United States Patent [19]
Carson et al.

[11] Patent Number: 6,158,719
[45] Date of Patent: Dec. 12, 2000

[54] BENT CRANKSHAFT FOR MOTORIZED VALVES

[75] Inventors: Kenneth G. Carson, Newmarket; Tamas A. Vepy, Willowdale, both of Canada

[73] Assignee: Honeywell International Inc., Morristown, N.J.

[21] Appl. No.: 08/895,125

[22] Filed: Jul. 16, 1997

[51] Int. Cl.[7] ............................................. F16K 1/16
[52] U.S. Cl. ............................... 251/298; 251/315.06
[58] Field of Search .............................. 251/88, 298, 299, 251/304, 229, 315.06

[56] References Cited

U.S. PATENT DOCUMENTS

| | | | |
|---|---|---|---|
| 1,171,189 | 2/1916 | Grandi | 251/298 |
| 3,086,746 | 4/1963 | Holleron | 251/303 X |
| 3,176,720 | 4/1965 | Donahue | 251/298 X |
| 4,085,952 | 4/1978 | Sharples | 251/298 |
| 4,182,373 | 1/1980 | Lewis | 251/298 X |

*Primary Examiner*—John Rivell
*Attorney, Agent, or Firm*—Robert B. Leonard

[57] ABSTRACT

A bent crankshaft assembly for motorized valves. The crankshaft is formed having three distinct regions, a connection region, a bend region, and a sphere retaining region. These regions are formed in a unitary rod without staking or milling operations.

4 Claims, 4 Drawing Sheets

BENT CRANKSHAFT FOR MOTORIZED VALVES

BACKGROUND OF THE INVENTION

The present invention relates to two or three way ball valves and more particularly to motorized ball valves used in heating, ventilating and air conditioning applications.

As an example, a two way Ball valve such as the one shown in prior art FIG. 1 are known in the art. Typically, the ball valve 100 included a valve body 105, a sphere 110, a shaft 115, a linkage arm 120, a sphere shaft 125, a Teflon sleeve 132, a bore 130, O rings 140, retainer ring 145, thrust washer 150, plate assembly 155, fasteners 160, stake 165 and stake 170. Shaft 115. in operation, was mated to a motor which when activated would rotate the shaft in order to reposition the sphere 110. Shaft 115 passed through bearing 175 into the interior of the valve housing 105. The valve housing 105 when mated with plate assembly 155 defined in an enclosed space through which a fluid such as water could pass.

Shaft 115 was typically made of stainless steel. The shaft was then connected to linkage arm 120. Linkage arm 120 typically was made of brass and was formed having two holes therein 180, 190. The shaft was liked to the linkage arm by having one portion of the shaft pass through hole 190. A staking operation to produce stake 170 was then performed to join the shaft and the linkage arm.

Similarly, sphere 110 is joined to linkage arm 120 through use of the sphere shaft 125. A staking operation was performed on sphere shaft 125 to form a head 127 which prevented the shaft from passing entirely through hole 180. The head 127 could be pre-formed using other means. Sphere 110 included bore 130 through which sphere shaft 125 could pass. Sphere 110 was typically made of an elastomeric material such as rubber. The ball was maintained on the shaft through use of washer 135 and stake 165. In some embodiments, a sleeve was placed inside bore 132 as a bearing surface to provide for rotation of sphere 110 during some valve operations.

O rings 140 prevented fluid from escaping through bearing 175. Retainer ring 145 held shaft 115 in place and prevented axial movement of the shaft into the bearing 175. Similarly, thrust washer 150 prevented axial movement of the shaft 115. Fasteners 160 were used to attach the plate assembly 155 to the valve body 105. Serration 180 provides a tight fit for assembly and prevents axial movement of shaft 125. Referring now to prior art FIG. 3, there shown is a top sectional view of the valve 100. The valve 100 includes fluid inlet 192 and fluid outlet 194. In operation, sphere 110 is moved toward or away from fluid inlet 192 on an arc through rotation of shaft 115. The closer that sphere 110 is to the mid point between fluid inlet 192 and fluid outlet 194, the greater the flow of fluid through the valve. As sphere 110 moves towards either the fluid inlet or the fluid outlet, flow through the valve is restricted. In the prior art, to shut off flow through the valve, sphere 110 was placed in contact with outside edge 196 and inside edge 198 to prevent fluid flow through fluid inlet 192. Again in the prior art, sphere 110 first made contact with outside edge 196 and then with inside edge 198. This caused rotation of sphere 110 about shaft 115 in the direction of arrow 199.

However, several problems existed with the prior art. First, many manufacturing operations are required to create multiple parts and the assembly of the sphere-crankshaft assembly. Shaft 115 must be machined. Linkage arm 120 must be stamped with two holes in it. Shaft 115, linkage arm 120 and sphere shaft 125 must be staked together.

In addition, four basic parts were required to make the crankshaft assembly. Further, since the shaft 115 and sphere shaft 125 were usually made of stainless steel, and the linkage arm 120 was made of brass, galvanic corrosion could occur at the joints of the dissimilar materials.

Lastly, because of the various machining requirements for the four separate parts, it was more difficult to place the tight fit sleeve 132 and sphere 110 correctly on the shaft. This was due to the accumulation of errors due to machining tolerances soldering and staking of the shaft components.

SUMMARY OF THE INVENTION

The present invention is a valve having a unitary crankshaft. The crankshaft can be cold formed of a material such as stainless steel or brass. The unitary shaft is formed with an angle region and a ball retaining region. By forming the crankshaft as a unitary device, many of the problems of the prior art are overcome.

DESCRIPTION OF THE PREFERRED EMBODIMENT

Figure 1:
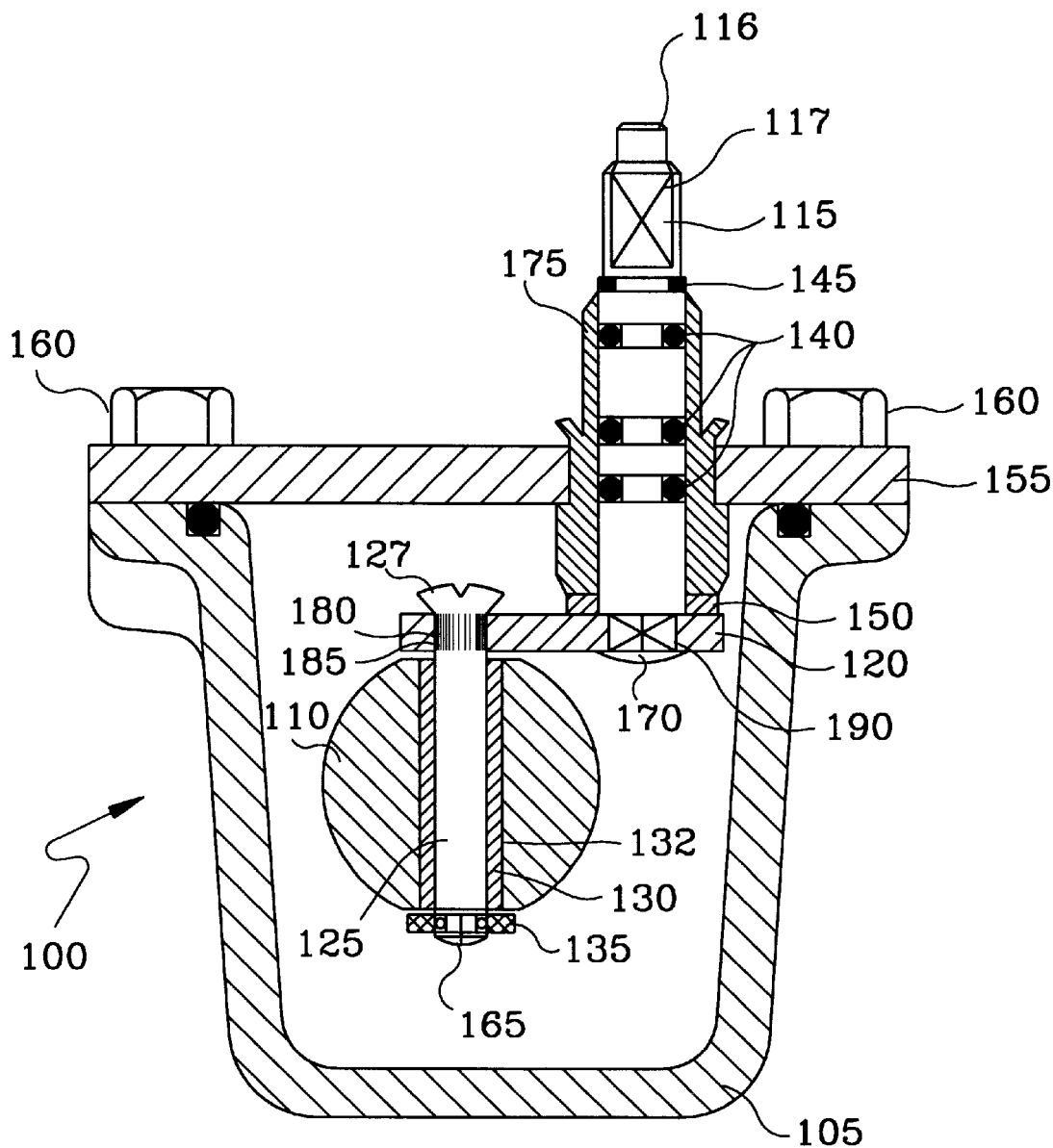
FIG. 1 is a cross-section of a valve using the prior art ball and crank assembly.
Figure 2:
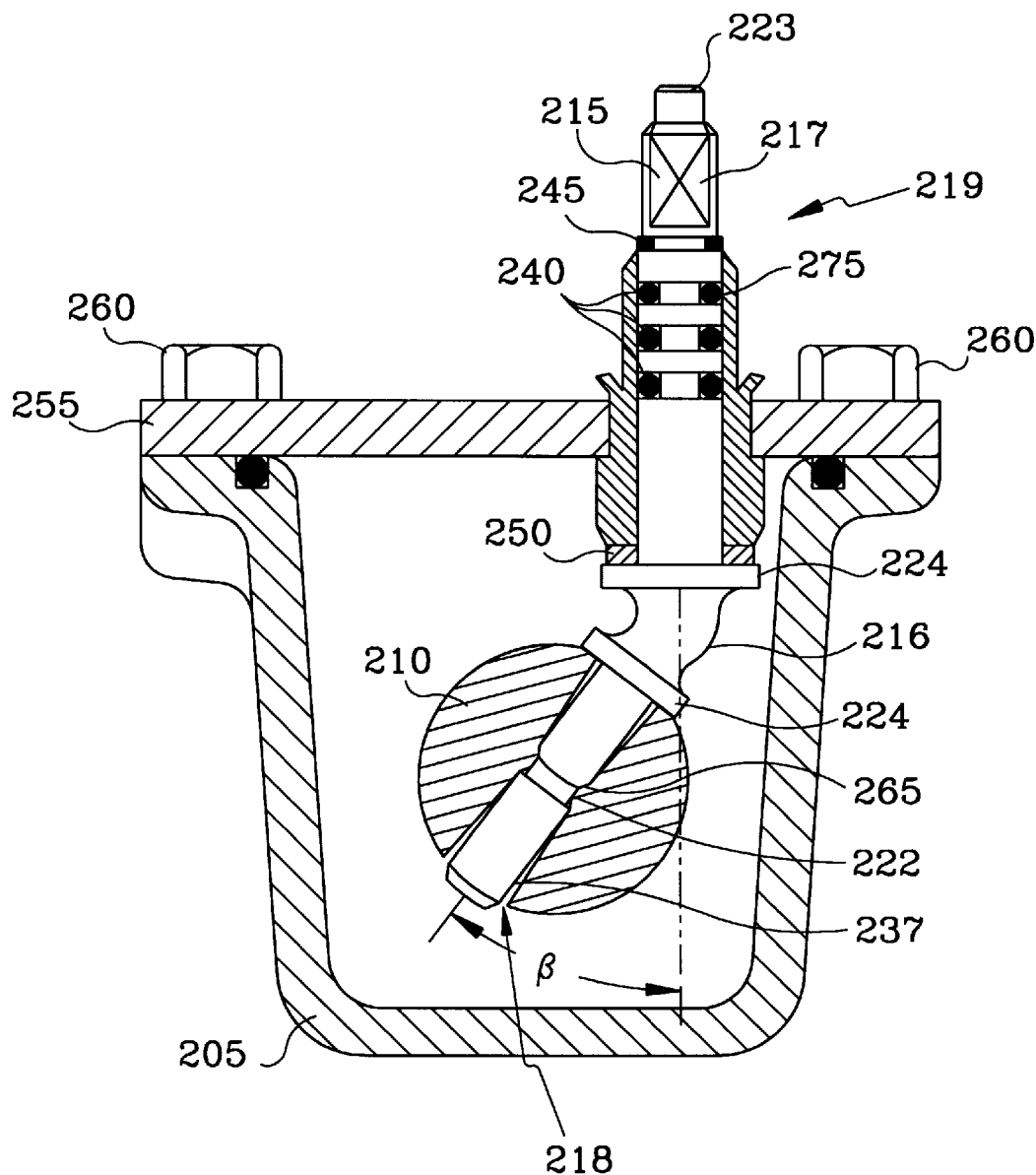
FIG. 2 is a cross-section of a valve using the inventive crank shaft ball assembly.
Figure 3:
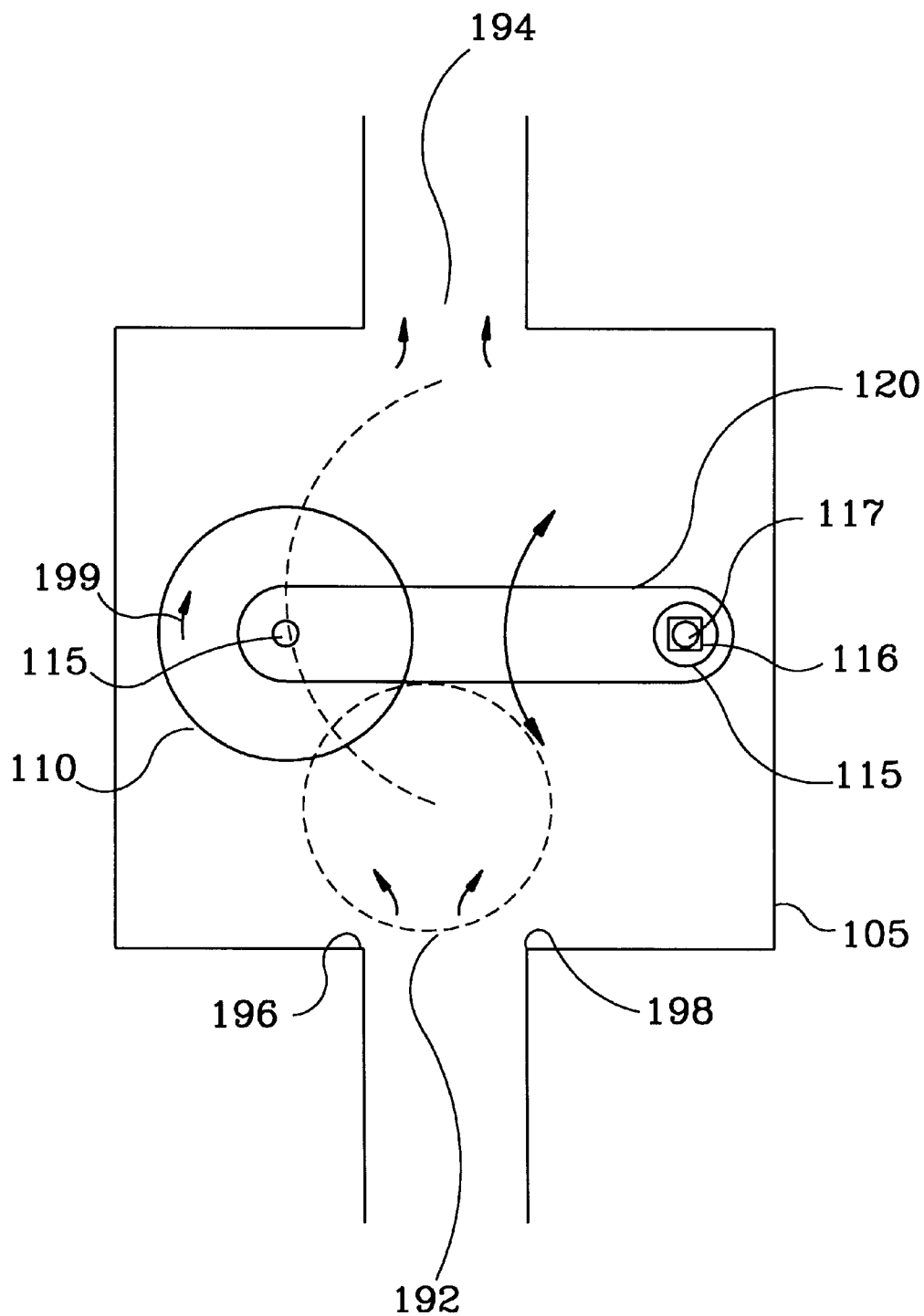
FIG. 3 is a top down view of a valve using the prior art crankshaft sphere assembly.

Referring now to FIG. 2, there shown is a valve assembly 200 in accordance with the present invention. Valve assembly 200 includes valve body 205, fluid blocking device 210, shaft 215, O-rings 240, retainer ring 245, thrust washer 250, cover assembly 255, fasteners 260 snap ring 265 and bearing 275. Shaft 215 passes through bearing 275 and is formed into at least three distinct regions. The first region, 219 is a drive region for connection to a valve drive device such as an electric motor. The drive region may contain flats 217 or other means of keying to transmit motor driving torque to force fluid blocking device 210 to close off fluid inlet 292 or outlet 294. Pin 223 provides concentric alignment between the crankshaft and drive mechanism.

The second region is angle region 216. The angle $\beta$ should not be too large otherwise shaft end or fluid blocking device region 218 may end up in bores 292 and 294 thereby preventing closure of the valve. In the preferred embodiment $\beta$ is equal to 45°. The collars 224 act as thrust bearing surfaces, in one case against bearing 275, in the other case against sphere 210.

The third region is the fluid blocking device mating region 218. In a preferred embodiment, the fluid blocking device is an elastomeric sphere. The fluid blocking device mating region in the preferred embodiment is formed by creating concentric indent 222 in rod 215. The indent is formed to match a snap ring 265 in the bore 237 of fluid blocking device 210. The indent in addition to retaining the fluid blocking device provides a bearing surface which allows fluid blocking device 210 to rotate about rod 215 to provide even wear.

The valve assembly also includes fasteners 260 for fastening cover assembly 255 to the valve body 205. Thrust washer 250 prevents axial movement of rod 215 through bearing 275.

Figure 4:
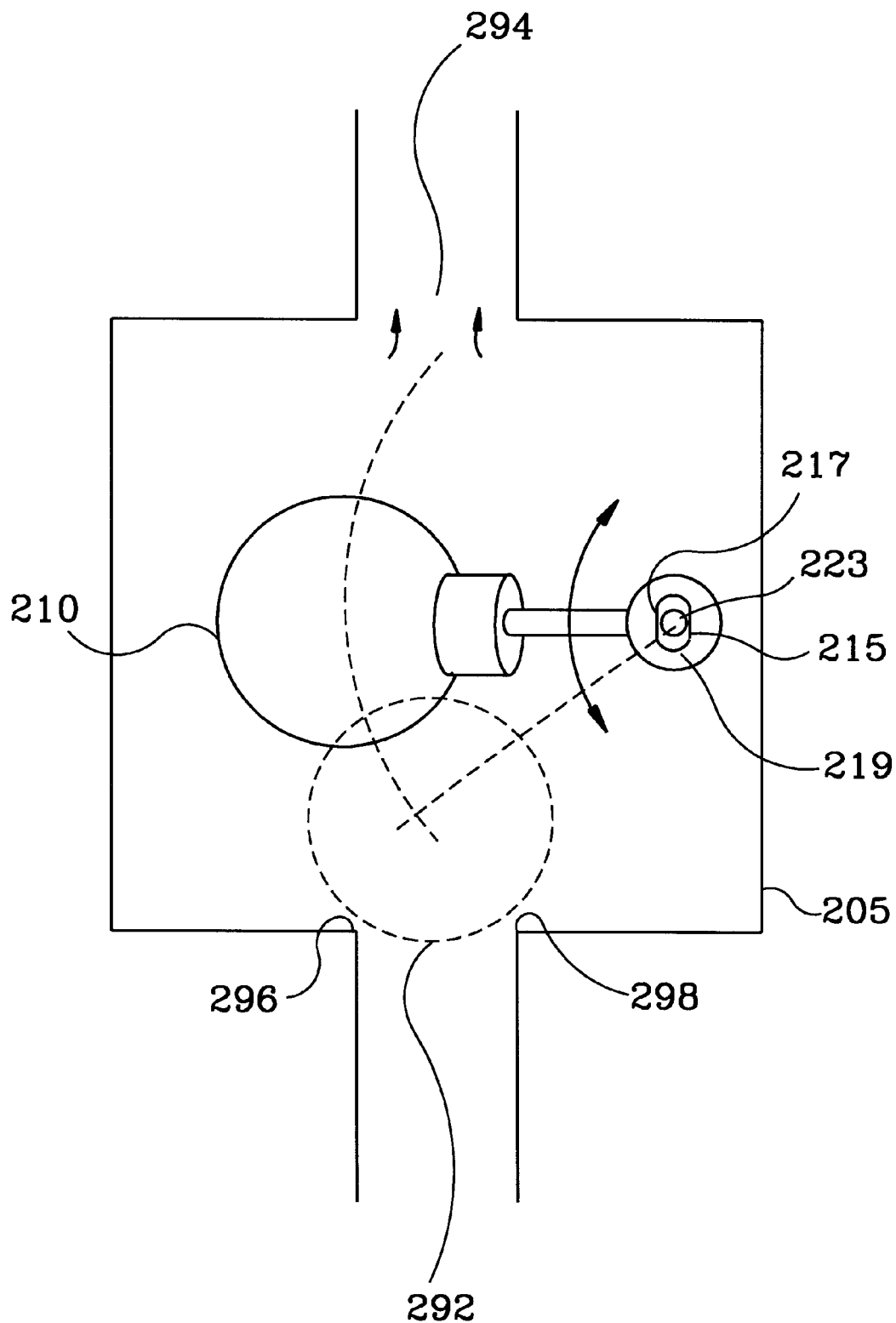
FIG. 4 is a top down view of a valve using the presently inventive crankshaft sphere assembly.

Referring now to FIG. 4, there shown in operation, fluid blocking device 210 is moved toward or away from bores 292 and 294 in an arc through a rotation of shaft 215. Unlike the prior art, the present assembly allows for the fluid blocking device to make contact first with inside edge 298, then with outside edge 296. The closing of the valve in this way works to reduce or eliminate water hammer. In addition, the structure of the present fluid blocking device assembly allows for more force at closure due to a shortened torque arm.

Shaft 215 is formed using any suitable process such as forging or turning. In a preferred embodiment, the shaft is constructed using stainless steel or brass. The sphere is made from an elastomeric material such as EPDM or nitral. Because the shaft is made as a unitary piece, there is less accumulation of errors in manufacturing tolerances for positioning the fluid blocking device into fluid outlet 294 or fluid inlet 292. Accordingly, placement of the fluid blocking device on the shaft is not as sensitive an operation with the presently invented shaft as with the prior shaft where the multiple part structure has led to an accumulation of errors.

The foregoing has been a description of a novel and non-obvious crankshaft for a valve. This description has been provided as an example of the invention, not as a limitation. The inventors describe the boundaries of their invention through the claims below.

We claim:

1. A valve crankshaft, comprising:
   a unitary rod having first and second ends, said unitary rod being formed into three regions:
      a drive region at said first end, said drive region having a flat formed therein;
      a bend region between said first and second ends, said bend region having a forming angle; and
      a sphere mating region between said bend region and said second end,
      wherein said sphere mating region comprises a recessed bearing surface in said rod for rotatably mounting a sphere having a bore including an internal snap ring, wherein said recessed bearing region is formed to match said internal snap ring.

2. A valve crankshaft as defined in claim 1, wherein:
   said angle is less than or equal to 45 degrees.

3. A valve for use in a fluid flow control system, valve being operated by a drive device, comprising:
   a valve body having an inlet and an outlet for allowing fluid flow therethrough;
   a spherical fluid blocking device having a bore including an internal snap ring;
   a unitary crankshaft connected to the valve body and having a drive mating region being formed to mate with the drive device, an angle region forming an angle in said crankshaft and a fluid blocking device mating region, said spherical fluid blocking device being connected to the crankshaft at the fluid blocking device mating region, wherein said fluid blocking device mating region comprises a recessed bearing surface in said unitary crankshaft for rotatable mounting said spherical fluid blocking device, wherein said recessed bearing region is formed to match said internal snap ring, said crankshaft being positioned within the valve body such that movement of the crankshaft in a first direction causes the spherical fluid blocking device to move toward the inlet and away from the outlet.

4. A valve as defined in claim 3, wherein said angle is less than or equal to 45 degrees.

* * * * *